April 16, 1929.  L. BORDWELL  1,709,768
EGG BEATER
Filed Feb. 4, 1927
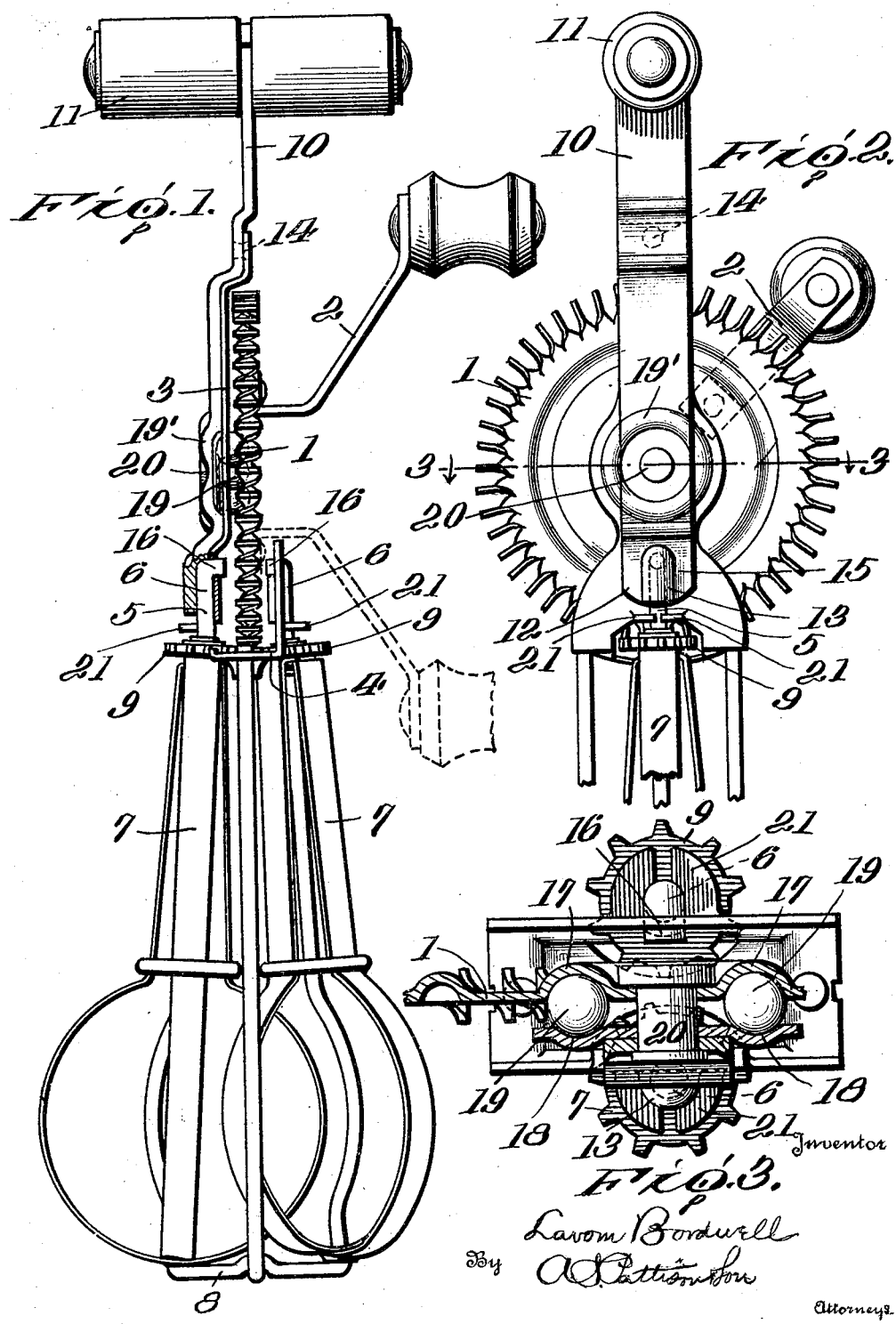

Patented Apr. 16, 1929.

1,709,768

UNITED STATES PATENT OFFICE.

LAVERN BORDWELL, OF NEW YORK, N. Y.

EGG BEATER.

Application filed February 4, 1927. Serial No. 165,952.

This invention relates to improvements in beaters and it is more particularly intended for household use in beating eggs, dressing, whipped cream and the like.

One feature of the present improvement is to provide the frame that supports the beater blades with a stiffening member which comprises the handle for holding the beater while the plates are being rotated.

Another object of the present improvement is to construct the frame and the said handle, that the frame is made up of thinner metal and the handle preferably of heavier metal and forming a brace for the frame, the lower part of the frame being short and wider than the handle, is in itself sufficiently stiff although made of thinner material. The lower end of the frame is essentially in a U-shape, and as shown, is much wider than the handle, and by making it of thinner metal it is readily bent into shape, while at the same time the frame is stiffened by the handle that runs lengthwise the frame and is permanently secured thereto.

A further improvement of the present invention is to extend the handle so that its lower end overlaps the upper end of one end of the beater plate supporting rod, whereby that end of the beater rod is permanently held in its proper position.

Another improvement of the present invention is forming ball bearing between the wheel and the said frame, the adjacent sides of the wheel and frame provided with ball races, the same containing balls that form the bearing for the operating wheel whereby the mechanism rotates perfectly and is a great improvement over bearings for similar devices that have been previously constructed.

Other improvements and advantages will appear from the following description:

Figure 1 is an edge elevation of a beater comprising the said improvements, that part of the handle and frame which embraces the upper end of the beater plate supporting arms being shown in section.

Figure 2 is an elevation of the upper end of the beater, showing the operating wheel in side view.

Figure 3 is an enlarged horizontal sectional view on the line 3—3 of Figure 2, looking in the direction indicated by arrows.

The improved beater of this application involves an operating wheel 1 having attached to its outer side a handle 2. A frame 3 is provided and the lower end of the frame is made U-shaped in elevation as shown at 4 in Figure 1. A wire or rod 5 has its ends 6 connected with the ends of the U-shaped member 4 of the frame 3. On this rod are journalled the beater plates 7 which as shown, are made in pairs, one each being journalled on opposite sides of the said rod, the lower end 8 of the rod being bent across whereby the rod is essentially U-shaped in elevation. Attached to the upper ends of each of the beater plates 7 are pinions 9, the lower periphery of the operating wheel 1 lying between these pinions and in engagement with them whereby the rotation of the operating wheel rotates the beater plates.

A handle 10 carrying at its upper portion a hand hold 11, extends down the outer side of the upper portion of the frame 3, and the lower end 12 of this handle is bulged outwardly as at 13 for the purpose of embracing the outer portion of one end of the rod 6. This handle 10 extends throughout the length of the vertical portion of the frame, and is attached to it by being spot welded to the frame at its upper end at the L-shaped portion 14 and being spot welded to the lower U-shaped part of the frame, for instance at the points 15. It will be observed that this spot welding of the handle serves to securely fasten the handle to the frame.

Attention is called to the fact that the frame is made of thinner metal than ordinarily, because the handle extending throughout the length of the frame, serves to brace it by the handle being ordinarily attached to the frame. Furthermore the handle 10 is preferably made of heavier material than the frame, whereby it thus doubly strengthens the frame and makes a very firm handhold for holding the device while it is being operated.

The main purpose of making these parts as described is to enable the lower part of the frame to be more readily shaped into a U-form than can be done if it is made of thick metal.

The extremities 16 of the rod 5 extend inward through openings formed in the widened portion of the U-shaped part of the frame, this construction, however, forming the subject-matter of a patent owned by the United Royalties Corporation and need not be further described.

A further improvement is the forming of a ball bearing for the operating wheel 1.

This is done in the construction here shown by forming a race 17 in the said operating wheel 1, and a corresponding race 18 in the frame 3, the said frame having its intermediate portion widened as shown at 19 for the purpose of enabling the race 18 to be formed in it, and the handle 10 being provided with a circular bend corresponding with the recess 18. It will be observed that Figure 1 is a full size view of the beater and that the balls 19 are relatively large. The said wheel is held against lateral movement by a suitable supporting member 20 that passes through the frame 3 and the handle 10, the same being riveted fast to these parts, the opposite end being enlarged.

This supporting member merely holds the balls 19 of the ball bearings in their races, while the balls serve as a support and as a bearing for the wheel. Therefore the support is merely a tie so to speak, for holding the balls in their races, the opening in the said wheel being sufficiently large that the balls receive the thrust of the wheel 1 being turned.

Furthermore the upper ends 6 of the rod 6 pass through lips 21 which extend outward from the U-shaped portion of the frame and these lips receive between them the ends of the rod and the lips thus grip the ends of the rod and serve to still further produce the said structure.

The specific form of the cogs on the operating wheel is old and needs no description.

While I have described the present improvements in detail, I wish it understood that variations may be made by those skilled in the art without departing from the spirit of the invention so long as the variations are within the scope of the appended claims.

Having thus described my invention, what I desire to claim and secure by Letters Patent is:

1. A beater comprising a frame having its lower end made U-shaped, a U-shaped rod having its upper ends connected with the upward portions of the U-shaped frame, the said rods carrying beater blades and a handle connected to the outer side of the frame, the said handle extending down and embracing one of the ends of the rod, the said handle being permanently connected with the frame at opposite sides of the rod and at its upper portion for the purpose specified.

2. A beater comprising a frame having its lower portion U-shaped and one leg extending upward, said frame made of relatively thin material to enable it to be properly shaped, a handle of heavier material applied to the outer side of the said frame throughout its length, beater blades supported by the U-shaped portion of the frame, a journal rod with its upper ends applied to the parallel portions of the U-shaped frame, the lower end of the heavy handle extending down and embracing the upper end of one of the said rods for holding it firmly in position during operation, the handle being permanently attached to the outer side of the said frame, pinions applied to the upper ends of the beater blades, a vertically arranged wheel extending between the said pinions, and a journal for the said wheel passing through the relatively light frame and the relative heavy handle whereby all of the parts are held against twisting and binding in operation and the said device made to smoothly perform its functions.

3. A beater comprising a frame having its lower portion bent U-shaped, one leg of the said frame extending upward, said frame consisting of relatively light metal for properly bending the U-shaped portion, a handle applied to the outer portion of the U-shaped frame, the upwardly extending leg of the frame enlarged laterally and provided with an outwardly extending circumferential groove, a vertically arranged operating wheel arranged at the inner side of the said frame, said wheel having a circumferential groove bent in a direction opposed to the bend in the said frame, balls located in the said grooves, and a journal passing through the said extension of the frame and through the said handle and firmly connected with both, the parts operating in the manner set forth.

4. A beater comprising a frame made of light material having its lower portion essentially U-shaped, its main vertical portion extending upward, one arm of the U-shaped portion extending upward and having an outwardly bulged annular ball race, a driving wheel located at the inner side of the frame having also an outwardly bulged ball race, balls within said race serving to support the wheel and the frame, a handle made of heavy material extending upward and lapping the thin metal and attached thereto, a shaft having one end firmly attached to said handle, the said parts operating in the manner set forth.

5. A beater comprising a frame having its lower portion made U-shape, a U-shaped rod having its upper ends connected with the said frame, beater blades on the said rod, pinions attached to the upper ends of said blades, said frame extending upward, an operating wheel with its lower portion between and in engagement with the said pinions, said wheel and frame-work having oppositely bent ball races and balls within the said races, whereby the frame and the wheel alone form a ball-bearing.

In testimony whereof I hereunto affix my signature.

LAVERN BORDWELL.